United States Patent [19]
Cobb et al.

[11] Patent Number: 5,689,605
[45] Date of Patent: Nov. 18, 1997

[54] SPLICE HOLDER ASSEMBLY FOR AN OPTICAL FIBER CABLE SPLICE CLOSURE

[75] Inventors: Gary Simpson Cobb, Norcross; Wesley Willing Jones, Lawrenceville; Edward R. Moore, Atlanta, all of Ga.

[73] Assignee: Lucent Technologies Inc., Murray Hill, N.J.

[21] Appl. No.: 386,241

[22] Filed: Feb. 9, 1995

[51] Int. Cl.$^6$ ...................................................... G02B 6/36
[52] U.S. Cl. ........................................................... 385/135
[58] Field of Search ........................................ 385/134–137

[56] References Cited

U.S. PATENT DOCUMENTS

| | | | |
|---|---|---|---|
| 4,958,903 | 9/1990 | Cobb et al. | 385/135 |
| 5,074,635 | 12/1991 | Justice et al. | 385/135 X |
| 5,097,529 | 3/1992 | Cobb et al. | 385/135 |
| 5,167,001 | 11/1992 | Debortoli et al. | 385/135 |
| 5,185,845 | 2/1993 | Jones | 385/135 |
| 5,206,927 | 4/1993 | Finzel et al. | 385/135 |
| 5,285,515 | 2/1994 | Milanowski et al. | 385/135 |
| 5,375,185 | 12/1994 | Hermsen et al. | 385/135 |
| 5,442,726 | 8/1995 | Howard et al. | 385/135 |

*Primary Examiner*—John D. Lee

[57] ABSTRACT

A splice holder assembly of this invention is used in an optical fiber cable splice closure. The assembly includes a splice tray that is an open-topped enclosure in which is mounted splice organizing modules that hold optical fiber splices. The tray includes retainers that confine optical fibers in a lower portion of the tray, and that also support a card with a list of splice locations and optical fiber identities coupled by each splice. The card supports at least one splice cassette situated inside of the splice tray. The splice cassette includes a bottom portion and a cover. To the bottom portion, at least one splice organizing module is mounted. The cassette's bottom portion also has T-shaped engagements which hold respective protective tubes housing optical fibers, that run between a distribution unit of the closure and the cassette. The slack of the optical fibers can be wound in the bottom portion of the cassette and the ends of the optical fibers coupled together with splices inserted and held in the modules. The cassette cover includes depressed portions which engage with the inner sides of the bottom portion. Hinged tabs of the cassette's bottom portion can be folded into engagement with the cover to hold the cover over the top of the bottom portion. The cassette cover can be provided with a label indicating splice locations and the optical fibers coupled at each splice. A strap holds the splice cassette(s) in the splice tray.

30 Claims, 6 Drawing Sheets

SPLICE HOLDER ASSEMBLY FOR AN OPTICAL FIBER CABLE SPLICE CLOSURE

BACKGROUND OF THE INVENTION

1. Field of the Invention

This invention relates to a splice holder assembly that increases the number of splices that can be contained in an optical fiber cable splice closure relative to prior art closures.

2. Description of the Related Art

U.S. Pat. No. 5,097,529 issued Mar. 17, 1992 to Gary S. Cobb, et al. discloses an optical fiber cable splice closure that is relatively compact, rugged and durable, and which provides considerable organization for optical fiber splices coupling the optical fibers of different cables. However, the splice capacity of this optical fiber cable splice closure is limited to 24 splices. In some applications, the splicing of more than 24 pairs of optical fibers may be required. Therefore, it would be desirable to increase the splice capacity of an optical fiber cable closure such as that disclosed in U.S. Pat. No. 5,097,529, without changing the dimensions of, or requiring significant additional costs to manufacture, the closure.

In addition, some optical fiber cable closures presently in use can expose the optical fibers to be spliced to damage. Typically, optical fibers are extremely fragile and can be broken easily particularly during movement of the splice organizer and/or optical fibers. It is desirable to protect the optical fibers to prevent or at least minimize breakage.

Another problem with optical fiber cable closures presently in use is the lack of any means to determine easily the identities of the optical fibers spliced together or the locations of the splices in a splice organizer that holds splices in these closures. Therefore, a service person has to determine the identities of the optical fibers spliced together and the locations of splices in the splice organizer by tracing the optical fibers. The tracing of the optical fibers is difficult and can require the movement of parts included within the splice organizer, thus subjecting the optical fibers to possible damage or breakage. Therefore, it would be convenient to a service person to be able to determine readily the locations of splices in a splice organizer and the identities of the optical fibers spliced together with the splices housed in a closure.

SUMMARY OF THE INVENTION

This invention is aimed at overcoming the problems described above. The splice holder assembly of this invention in a preferred embodiment thereof is adapted to fit in the distribution portion of a closure such as that disclosed in U.S. Pat. No. 5,097,529. The splice holder assembly includes a splice tray having a bottom surface and sides defining an open-topped enclosure. Inside of the splice tray on the bottom, three depressed areas or recesses are formed to receive respective splice organizing modules such as those disclosed in U.S. Pat. No. 5,185,845. Inside of the splice tray, retainers which protrude perpendicular to the inner surfaces of the sides inside of the splice tray at a level above the bottom surface of the splice tray, hold the slack of optical fibers to be spliced with splices inserted in the splice organizing modules, in near proximity to the bottom of the splice tray. With the optical fibers confined by the retainers and the bottom and inner side surfaces of the splice tray, they are less likely to be lifted out of the splice tray and exposed to damage when the splice tray is moved. Also, the retainers prevent the optical fibers from being pinched against the surfaces of the splice tray by a splice cassette when inserted in the splice tray. The sides and bottom of the splice tray define at least one gap through which can be fed from the distribution portion protective tubes housing respective groups of optical fibers. In order for the splice tray to be engaged and secured to the distribution portion, the splice tray has a split finger at one end which is adapted to couple to an opening of a bracket of the distribution portion. At its other end, the splice tray includes a surface defining cut-out portions which engage with hook-like portions of the distribution portion.

On their upper surfaces, the retainers support a card which fits inside of the splice tray and substantially encloses a bottom portion thereof to protect the optical fibers housed in the splice tray. On one surface, the card includes a label or printing with spaces in which can be written information indicating the identities of the optical fibers on respective sides of a splice in association with the location of the splice in the splice organizing modules. This information can include the cable, unit or group of fibers within the cable, and fiber within the unit, to identify uniquely the optical fiber on each side of the splice. Preferably, this information is provided distinctly for each splice organizing module in the splice tray.

The card supports at least one splice cassette. Each splice cassette includes a bottom portion and a cover. The bottom portion has a bottom surface with raised sides that define an open-topped enclosure. The bottom portion of each splice cassette has raised borders defining three areas to receive respective splice organizing modules such as those disclosed in U.S. Pat. No. 5,185,845. On either side of the longitudinal axis of each cassette, the bottom portion has gaps defined by the sides and bottom surface of the splice cassette. The gaps allow protective tubes that house units of optical fibers to be inserted from the distribution portion into the splice cassette. The protective tubes are held in position against the inner surfaces of the sides in the splice cassette with respective engagements that are preferably T-shaped, disposed in near proximity to respective gaps. The splice cassette also includes integral hinged tabs which can be folded upwardly and/or outwardly to allow the cover to be fitted on the bottom portion. The hinged tabs can then be folded inwardly of the side edges of the bottom portion to engage and hold the cover in place.

The cover is a substantially planar surface with depressed portions near the edges thereof. The depressed portions of the cover engage with the inner surfaces of the sides of the bottom portion to hold the cover in position to close and protect the optical fibers spliced in the bottom portion of the splice cassette. The contact between the depressed portions and the inner surfaces of the sides of the splice cassette prevent the optical fiber from sliding along the sides out of the splice cassette to be exposed to damage.

Preferably, the cover defines cut-away portions in correspondence with the hinged tabs so that the cover is better held in position when the hinged tabs are folded into engagement with the edges of the cover defined by the cut-away portions. Also, in correspondence with the gaps of the bottom portion, the cover has cut-away portions which allow freedom of movement for the protective tubes when a service person removes or places a splice cassette in the splice tray. Similarly to the card, the cover of the splice cassette includes a label or printing with spaces in which can be written the identities of the optical fibers coupled together in each splice in association with the location of a splice in a splice organizing module of the splice cassette. Preferably, the information included in the label or printing is grouped in three distinct lists corresponding to the three splice organizing modules contained in a splice cassette. Preferably, at least the bottom portion of each splice cassette is made of white, opaque vacuum-formed plastic. To secure the splice cassettes in position in the splice tray and to reinforce the engagement of the splice tray to the distribution portion, a strap or the like can be wrapped and fastened about the widths of the distribution portion and the splice tray.

The splice holder assembly of this invention easily contains 54 splices and, with care in assembly, can hold up to 72 splices. In addition, the protective tubes allow splice cassettes to be readily removed or stacked in the splice tray without exposing the optical fibers to damage. Further, the engagements in each splice cassette firmly hold respective protective tubes and prevent breakage of the optical fibers extending from the tubes due to pulling of the optical fibers when a splice cassette is removed from or stacked in the splice tray. Further, the use of a white, opaque material to form at least the bottom portion of each splice cassette provides a background conducive to easy visual identification of the color schemes identifying the optical fibers housed in the splice cassette. Also, the use of labels or printing on the covers of the splice cassette and on the card allow ready identification of the optical fibers coupled on each side of a splice as well as the location of the splice in the splice organizing modules. Thus, these labels eliminate the need to perform the difficult task of tracing optical fibers. Further, the use of splice organizing modules such as those disclosed in U.S. Pat. No. 5,185,845 allows for accommodation of most, if not all, splices presently commercially available. In addition, because some of the retainers can be broken off, the splice tray of this invention is convertible into a configuration suitable for accommodating organizing modules as disclosed in U.S. Pat. No. 5,097,529.

These together with other objects and advantages, which will become subsequently apparent, reside in the details of construction and operation as more fully hereinafter described and claimed, reference being had to the accompanying drawings, forming a part hereof, wherein like numerals refer to like parts throughout.

BRIEF DESCRIPTION OF THE DRAWINGS

The present invention can be better understood with reference to the following drawings. The drawings are not necessarily to scale, emphasis instead being placed upon clearly illustrating principles of the present invention.

DESCRIPTION OF THE PREFERRED EMBODIMENTS

Figure 1:
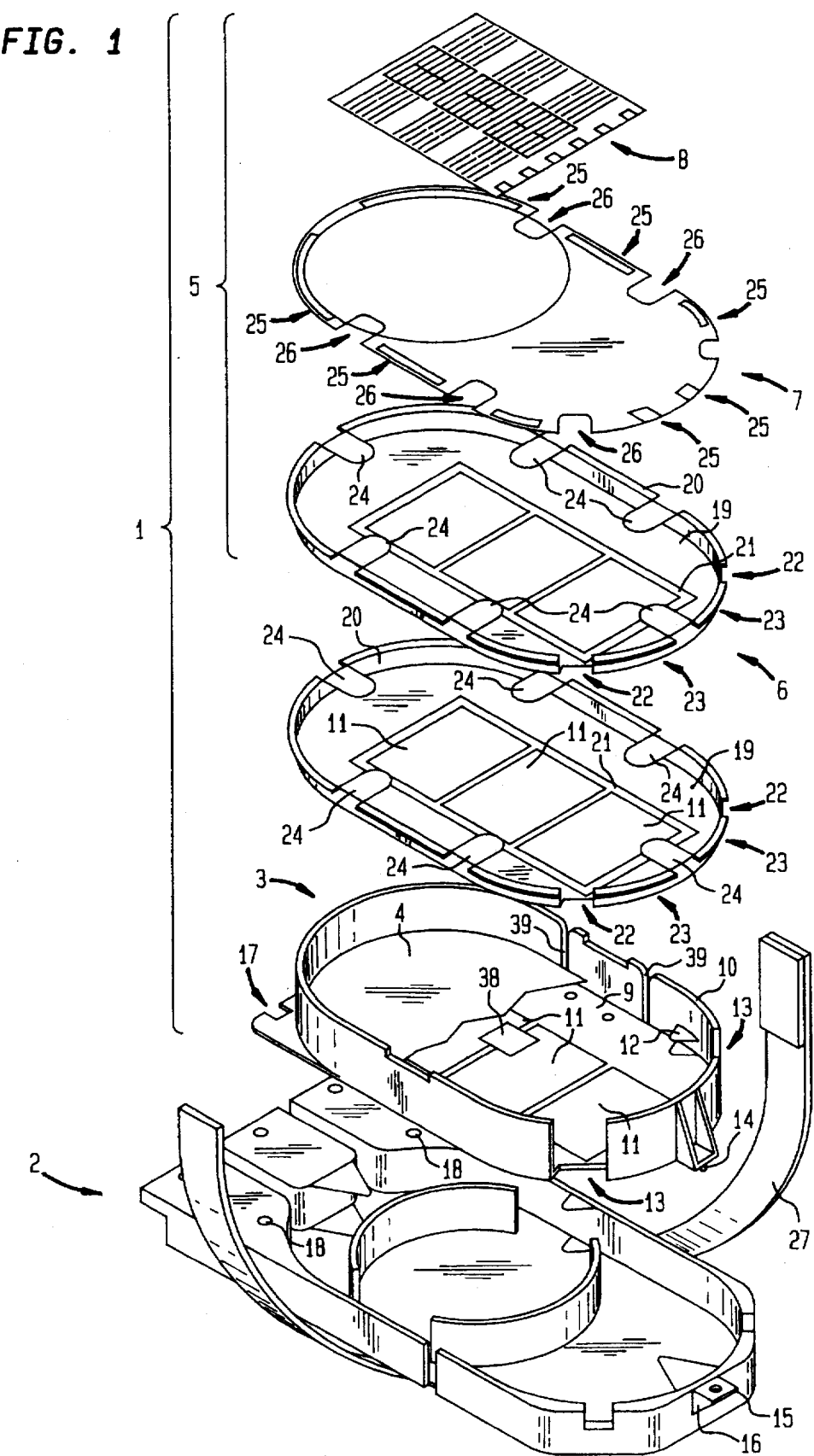
FIG. 1 is an exploded perspective view of a splice holder assembly in accordance with this invention.

In FIG. 1, a splice holder assembly 1, in a preferred embodiment of this invention, is adapted to be engaged with a distribution portion 2 of an optical fiber cable splice closure such as that disclosed in U.S. Pat. No. 5,097,529 issued Mar. 17, 1992 to Gary S. Cobb, et al., which is incorporated herein by reference as if set forth in full hereinafter. Preferably, the splice holder assembly 1 includes a splice tray 3, a card 4, and at least one splice cassette 5 including a bottom portion 6, a cover 7 and a label 8. For clarity, only one complete splice cassette 5 is indicated in FIG. 1. It should be understood that the bottom portion 6 nearest the splice tray 3 in FIG. 1 also has a cover 7 and preferably a label 8 (although not shown in FIG. 1) which together comprise a splice cassette 5.

The splice tray 3 includes a bottom 9 from which sides 10 extend perpendicularly. The sides 10 extend to a height that is the same or similar to the height of the stacked organizing modules of U.S. Pat. No. 5,097,529 so that the splice holder assembly 1 of this invention can replace the optical cable organizer of U.S. Pat. No. 5,097,529, and yet fit into the cover of U.S. Pat. No. 5,097,529.

In the bottom 9 of the splice tray 3, three recesses 11 are defined by the bottom 9. The recesses 11 are sized to receive splice organizing modules (not shown in FIG. 1) such as those disclosed in U.S. Pat. No. 5,185,845 issued Feb. 9, 1993 to Wesley W. Jones, which is incorporated herein by reference as if set forth in full hereinafter. The splice organizing modules are adhered or otherwise mounted to respective recesses 11.

Along the inner surfaces of the sides 10, a plurality of retainers 12 are formed. The retainers 12 are parallel with the bottom 9 but raised above the bottom 9. The retainers 12 function to retain the slack of optical fibers that are spliced in the splice organizing modules that are adhered to the recesses 11. The retainers 12 also serve to support a bottom surface of the card 4 when inserted into the splice tray 3.

On one side of the splice tray 3, the retainers 12 have thin portions contacting the side of the splice tray 3. These thin portions allow the retainers 12 on the one side of the splice tray 3 to be broken off. This feature combined with the existence of the square aperture 38 defined in the bottom 9 and slots 39 defined in the side of the splice tray 3, allow the splice tray to be converted to a configuration suitable to accommodate organizing modules as disclosed in U.S. Pat. No. 5,097,529.

The splice tray 3 also has gaps 13 which are defined by the sides 10 and the bottom 9 of the splice tray 3. The gaps 13 allow passage of protective tubes that house groups of optical fibers to be fed from the distribution portion 2 to the splice tray 3 or the splice cassettes 5. At one end, the splice tray 3 has a split finger 14 adapted to fit into an opening 15 defined in a bracket 16 of the distribution portion 2. At its other end, the splice tray 3 defines cut-out portions 17 that engage with hooked portions 18 of the distribution portion 2. The splice tray 3 can be formed, for example, from injection-molded plastic material such as polycarbonate or other plastic.

The card 4 (only a portion of which is shown in FIG. 1) is formed of plastic such as polyvinyl chloride (PVC), for example, and is sized to fit in the splice tray 3 to enclose a lower portion of the splice tray 3. Preferably, the card 4 includes printing printed with a machine or by hand, with a table having spaces in which information regarding the identities of optical fibers on each side of a splice can be written. For example, the information can include the cable, the unit within the cable, and the optical fiber within the unit, written in association with the cable, unit and fiber of the optical fiber on the other side of the splice. The information also can include the location of a splice in the splice organizing module. Still further, the information can be grouped for each splice organizing module so that a service person can readily determine the location of a splice of interest in the splice organizing modules by referring to the information on the card 4.

Each cassette 5 is sized to fit in the splice tray 3. If more than one splice cassette 5 is used, the splice cassettes 5 can be stacked in the splice tray 3.

The splice cassette 5 includes the bottom portion 6 that has a bottom 19 and raised sides 20 extending from the bottom 19. The bottom 19 has raised borders 21 that define three areas sized to receive splice organizing modules such as those disclosed in U.S. Pat. No. 5,185,845. The bottom 19 and the sides 20 define gaps 22 through which a single protective tube housing optical fibers can be passed from the distribution portion via the gap 13 in the splice tray 3. To hold the protective tubes in position in the splice cassette 5, the bottom portion 19 includes engagements 23, preferably T-shaped, which secure respective protective tubes so that the optical fibers extending from the ends of the protective tubes, will not be damaged by pulling when the splice cassette 5 is moved. Alternatively, the protective tubes can be held in the splice cassette 5 with an adhesive or adhesive tape, for example. At the top edges of the sides 20, hinged tabs 24 are formed. The hinged tabs 24 can be folded about their hinges to allow the cover 7 to be placed over the top of the bottom portion 6. The cover 7 is secured in position by folding the tabs 24 inwardly to engage with the cover 7.

Preferably, the bottom portion 6 is formed from a white, opaque plastic material that is vacuum-formed. The white opaque background allows the optical fibers in the bottom portion 6 to be readily identified according to their color schemes. Also, because the bottom portion 6 is vacuum-formed, it is relatively inexpensive.

The cover 7 is preferably formed of vacuum-formed plastic such as PVC. The cover 9 includes depressed portions 25 formed along the edges of the cover 7. When the cover 7 is placed on the bottom portion 6, the depressed portions 25 engage with the inner surfaces of the sides 20 to hold the cover in position. In addition, the contact between the depressed portions 25 and the sides 20 prevents the optical fibers from escaping the splice cassette to be exposed to possible damage. Also, the cover 7 includes cut-away portions 26 positioned in correspondence with the tabs 24 of the bottom portion 6. The cut-away portions 26 are defined in the cover 7 so that the tabs 24 engage with the edges of the cover 7 defining the cut-away portions 26.

The label 8 is adhered to the cover 7. The label 8 includes printing made by machine or by hand, including spaces in which the cable, unit and fiber can be written to identify the optical fibers on each side of a splice. Thus, a service person can readily determine the absence or presence of a splice of interest in the splice cassette 5 without having to open the splice cassette 5 and visually examine the optical fibers and splices therein. Further, the label 8 can be used to indicate the location of a splice in the splice organizing modules contained in the splice cassette 5. Alternatively, the printing on the label 8 can be printed directly on the cover 7 without using the label 8.

The splice cassettes 5 are held in containment in the splice tray 3 with a strap 27 made of a material such as velcro™, an elastic or rubber band, a string or other strap-like material, wrapped and fastened about the width of the distribution portion 2 and the splice tray 3. The strap 27 also holds the splice tray 3 into engagement with the distribution portion 2 to reinforce the engagement afforded by the cut-out portions 17 and the split finger 14.

Figure 2:
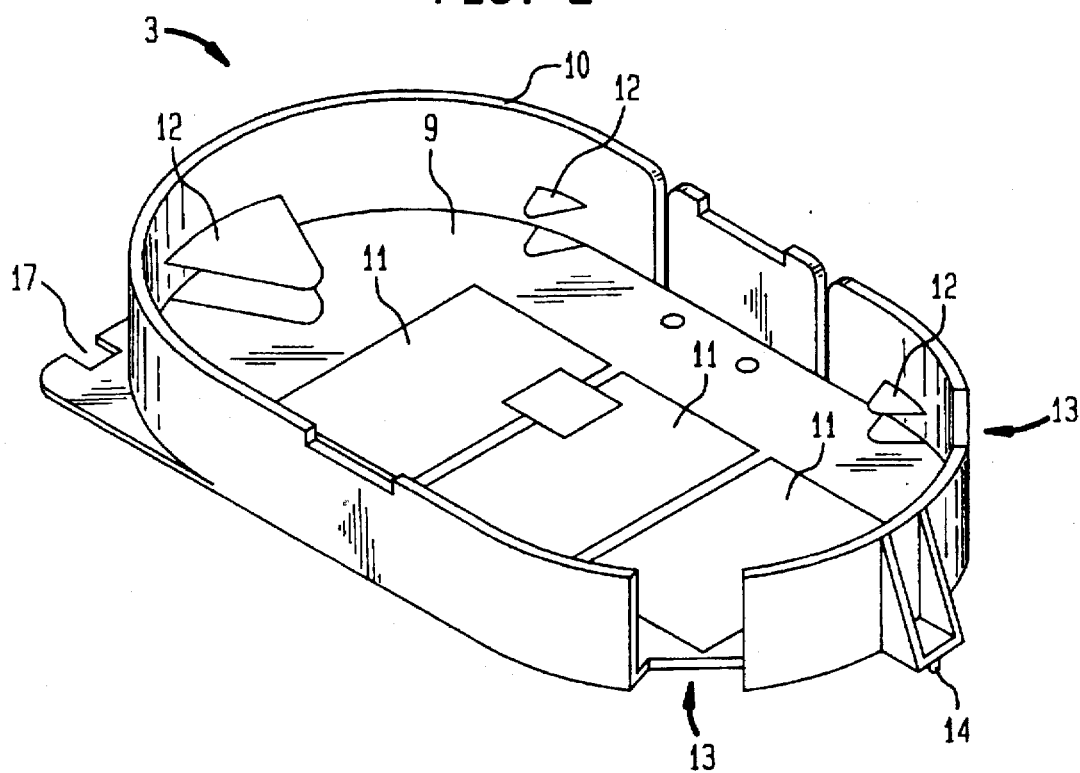
FIG. 2 is a first perspective view of a splice tray.

FIG. 2 shows the splice tray 3 with the card 4 removed. Thus, some of the retainers 12 that were blocked from view in FIG. 1 can be seen in FIG. 2. The two retainers 12 that can be seen in FIG. 2 disposed on the same side of the splice tray 3 have thin portions in contact with the sides that allow a service person to break off these retainers to convert the splice tray 3 for use with the organizing modules disclosed in U.S. Pat. No. 5,097,529.

Figure 3:
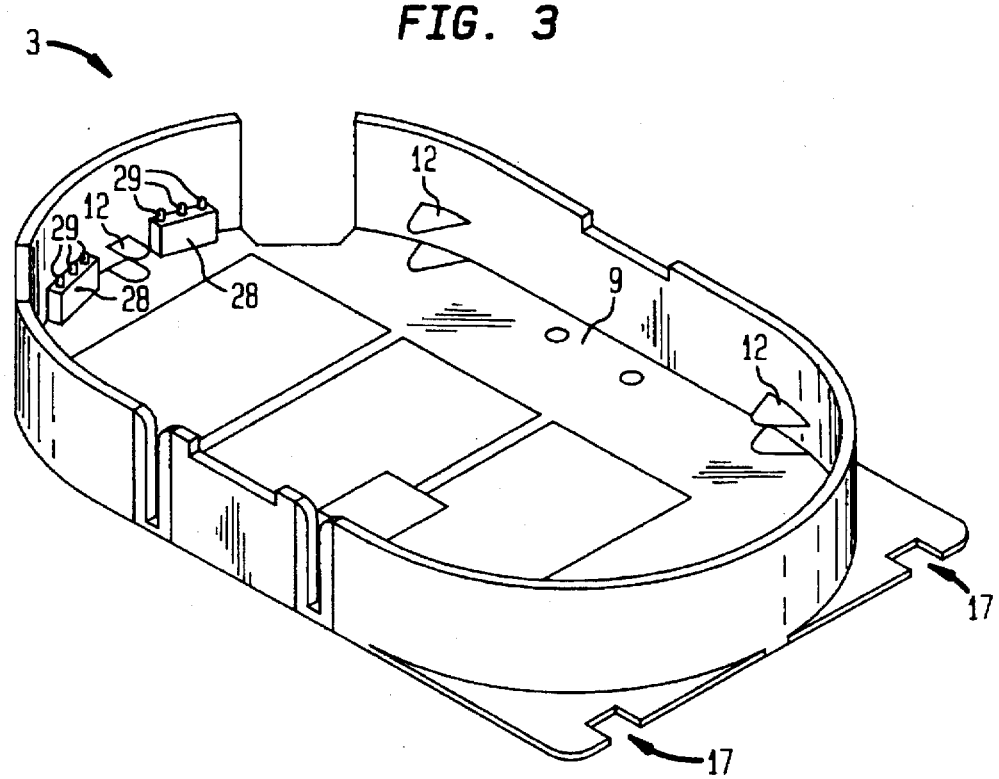
FIG. 3 is a second perspective view of the splice tray.

FIG. 3 is a second perspective view of the splice tray 3. In FIG. 3, the cut-out portions 17 and the remaining retainers 12 can be readily seen. In addition, engagements 28 and friction surfaces 29 can be seen in FIG. 3. The engagements 28 are perpendicular to the bottom 9 and displaced away from the sides 10. Opposing engagements 28, respective ridge-like friction surfaces 29 are formed on the sides 10. Between the engagements 28 and the friction surfaces 29, a self-adhesive plastic foam tape material (not shown) with an adhesive surface that is wrapped around the protective tube of a group of optical fibers, can be placed to secure the protective tube in position in the splice tray 3. Of course, the protective tube can be attached to the splice tray 3 in other ways than that described immediately above, such as by using adhesive or adhesive tape to adhere the protective tube to the splice tray 3, for example.

Figure 4:
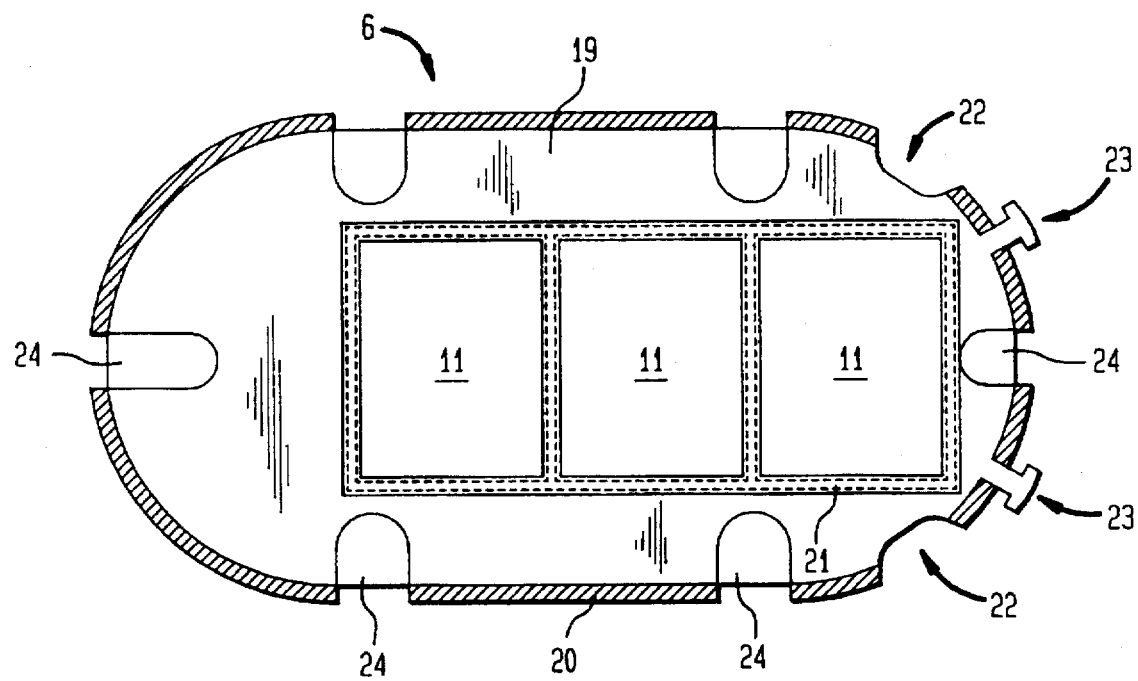
FIG. 4 is a top plan view of a bottom portion of a splice cassette.

In FIG. 4, the engagements 23 can be clearly seen. The engagements 23 are preferably T-shaped and extend from the rims of the sides 20. The T-shaped engagements 23 along with the tabs 24 and the gaps 22, are formed from a single integral piece of vacuum-formed plastic from which the bottom portion 6 is made. After molding, the bottom portion 6 initially has a solid piece of plastic extending from the rims of the sides 20. The tabs 24, the gaps 22 and the T-shaped engagements 23 and the rims of the sides 20 are die cut from this solid piece of plastic. More particularly, the sides 20 are die cut at the sides of the T-shaped engagement 23 so that the T-shaped engagement 23 is hingedly coupled to the bottom surface 19, but no longer is attached to the sides 20 due to the cutting. The manner of using the T-shaped engagements will be explained later in this document with reference to FIGS. 8–10.

Figure 5:
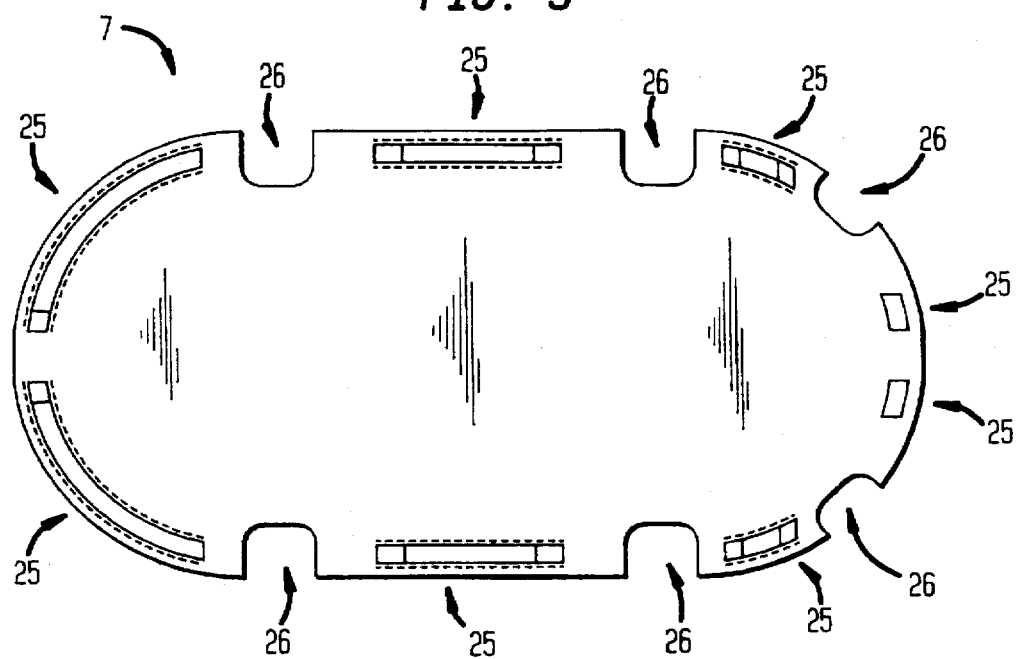
FIG. 5 is a top plan view of a cover of the splice cassette.

FIG. 5 is a top plan view of the cover 7. Along the edges of the cover 7, depressed surfaces 25 are formed to engage with the inner surfaces of the sides 20 of the bottom portion 6. The contact between the depressed surfaces 25 and the sides 20 prevents the optical fibers housed in the splice cassette 5 from riding up the sides 20 to escape the splice cassette 5 where they can be exposed to damage. The depressed surfaces 25 are formed between the cutaway portions 26 where the tabs 24 serve to confine optical fibers in the splice cassette 5 when folded into contact with the cover 7. Thus, the contact between the depressed surfaces 25 and the sides 20 as well as surfaces of the tabs 24, confine the optical fibers in the splice cassette 5 along substantially the entire periphery of the cover 7.

As previously explained, the cover 7 defines cut-away portions 26, four of which engage with corresponding tabs 24 of the bottom portion 6, and two of which allow freedom of movement of the protective tubes housing optical fibers when a splice cassette 5 is removed from or placed in the splice tray 3.

The cover 7 can be formed from vacuum-formed molded plastic such as PVC. The depressed areas 25 are molded with the cover 7, and the cutaway portions 26 together with the edges of the cover 7, are die cut after molding.

Figure 6:
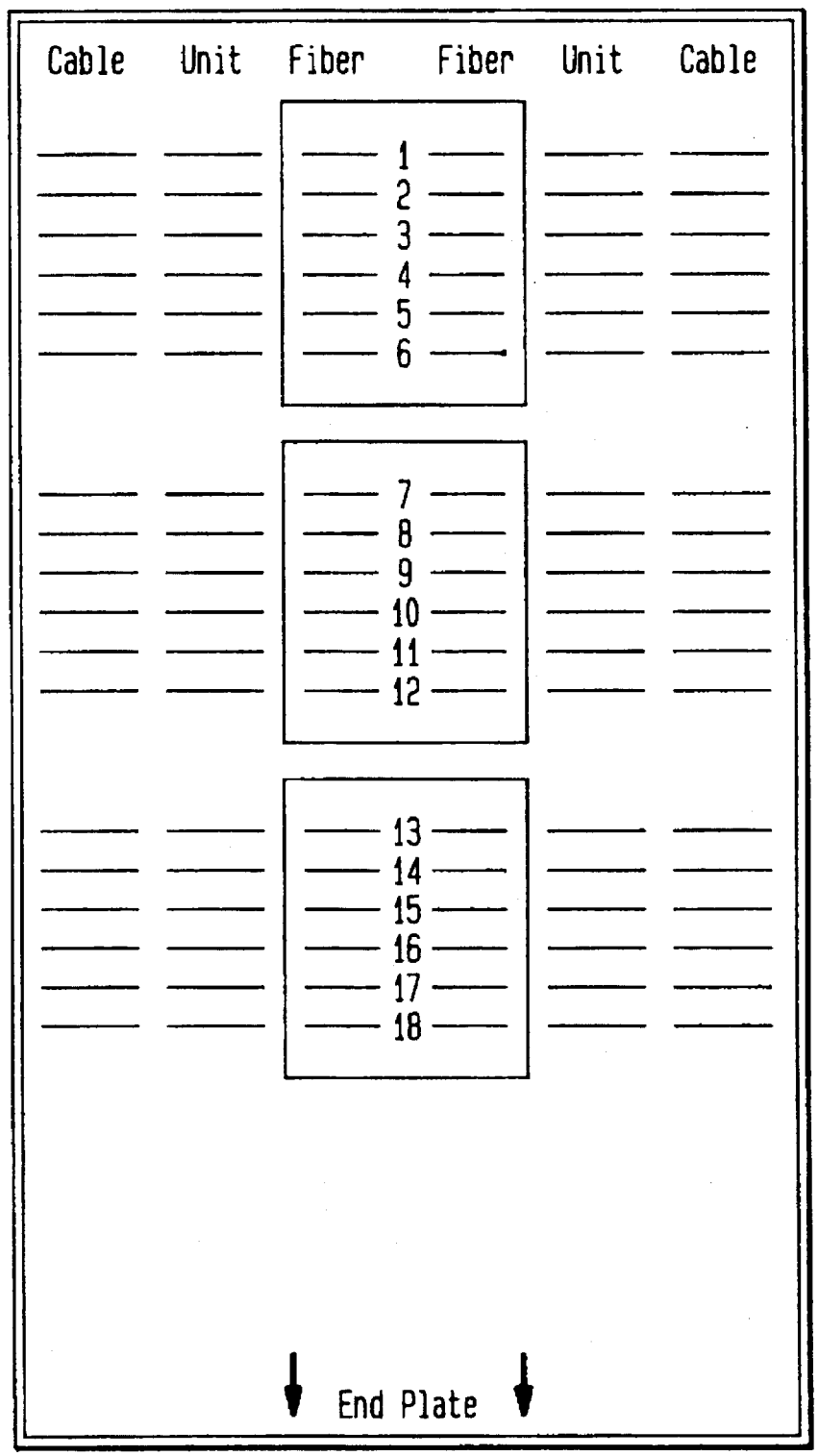
FIG. 6 is a view of a label for the splice cassette or splice identification card.

FIG. 6 is a top plan view of the label 8. On its underside, the label 8 has adhesive material to adhere the label 8 to the exposed surface of the cover 7 of the splice cassette 5. The label 8 can also be adhered to the card 4. Alternatively, the printing and/or information included in the label 8 can be printed directly on the card 4 or the cover 7. The label 8 includes an array or list of spaces in which can be written information identifying the cable, unit and fiber on each side of a splice. Also, the information uniquely identifying the optical fibers on each side of a splice can be written in association with a location of the splice in the splice organizing modules. Preferably, this information is provided in distinct groups for each of the three splice organizing modules that hold up to 6 splices. Each splice location is indicated by numerals 1–18 on the label 8. When a splice is completed by a service person, the service person installs the splice into a particular location in a splice organizing module contained in the splice cassette 5 or the splice tray 3. The service person then writes, or causes to be written with a printing machine, the identities of the two optical fibers that have been spliced together in association with the location in which the splice has been placed in the splice organizing module. Thus, for example, the service person writes the identity of the cable, unit and fiber on the label 8 on each side of a splice in association with one of the numerals 1–18 representing the location of the splice in one of the splice organizing modules.

Figure 7:
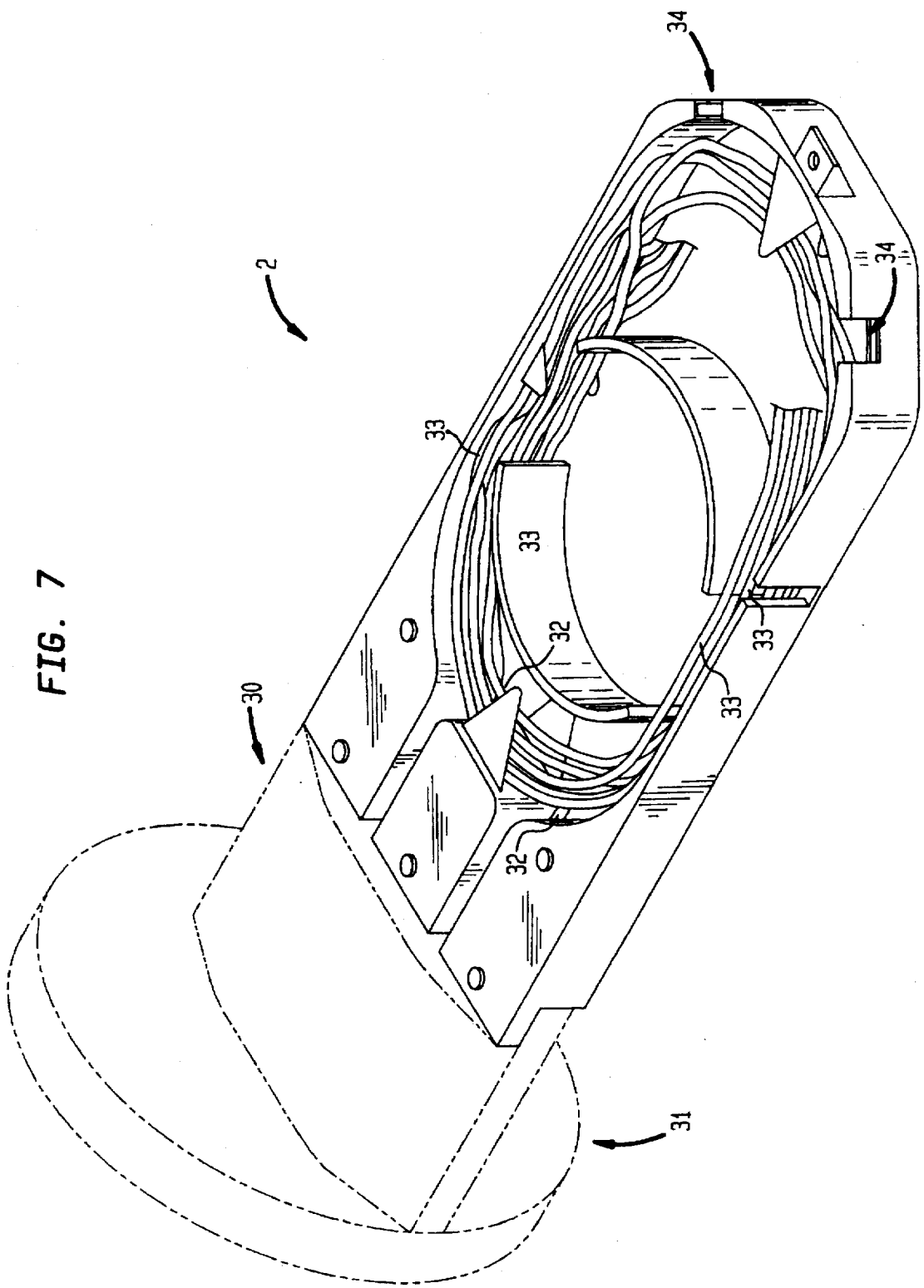
FIG. 7 is a perspective view of the distribution portion to which the splice holder assembly of this invention is attached.

FIG. 7 shows a distribution portion 2 that is mounted to a housing portion 30 attached to a cable entry portion 31, as disclosed in U.S. Pat. No. 5,097,529. On the side of the cable entry portion 31 opposite the housing portion 30, optical fiber cables are received and fed through the cable entry portion 31. The optical fiber cables are held in position in the cable entry portion and stripped of their outer layers to expose respective plastic tubes in which optical fibers are fixed. The optical fibers of each cable are threaded through a tube 32 that is slipped over the plastic tube of the cable. The optical fibers are grouped in units and fed through protective tubes 33 preferably formed of flexible PVC. A sealant is applied inside the tube 32 and the ends of the protective tubes 33 are fitted inside an end of the tube 32. The slack of the protective tubes is wound inside the distribution unit 2 and the ends of the protective tubes 33 (indicated by breaks in FIG. 7) are fed through gaps 34 in the side of the distribution unit 2. The splice tray 3 is then fitted into engagement with the distribution unit 2. In the splice tray 3, three splice organizing modules such as those disclosed in U.S. Pat. No. 5,185,845, are adhered in the recesses 11. Alternatively, if the splice tray 3 is to be converted for use with organizing modules as disclosed in U.S. Pat. No. 5,097,529, the retainers 12 on one side of the splice tray 3 are broken off at respective thin portions, and the slots 39 and the square aperture 38 are used to mount organizing modules, as disclosed in U.S. Pat. No. 5,097,529.

If the splice tray 3 is to be used to hold splice cassettes 5 as opposed to the organizing modules in U.S. Pat. No. 5,097,529, the ends of the protective tubes 33 for two optical fiber units are wrapped with self-adhesive plastic foam tape materials which are inserted between respective engagements 28 and friction surfaces 29 to hold the protective tubes 33 in position in the splice tray 3. Alternatively, the protective tubes 33 are adhered with an adhesive or adhesive tape, for example, to the splice tray 3. The slack of the optical fibers extending from the ends of the protective tubes 33, is then wound inside of the splice tray 3 and held in position by the retainers 12, as well as the sides and the bottom of the splice tray 3. Splices between optical fibers are made, and the splices are placed in locations in the splice organizing modules. Information regarding the identities of the optical fibers coupled together in each splice are written by a service person or machine in association with the splice location in the splice organizing modules on the card 4 directly or on a label 8 that is adhered to the card 4. After completing the splicing for up to 18 splices, the card 4 is fitted inside of the splice tray 3 with the information exposed to view.

Figure 8:
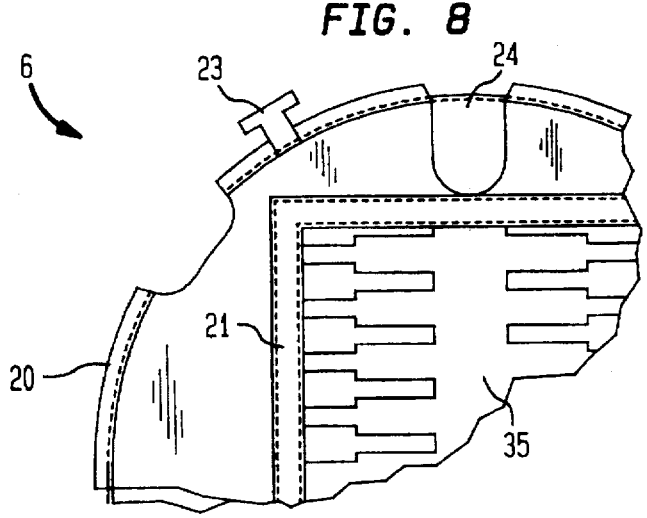
FIGS. 8–10 are top plan views indicating the operation of securing protective tubes housing optical fibers in the bottom portion of each splice cassette using T-shaped engagements.
Figure 9:
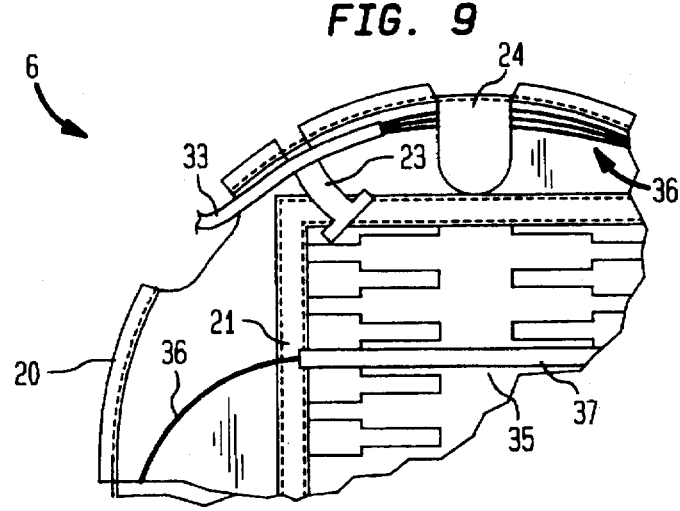
Figure 10:
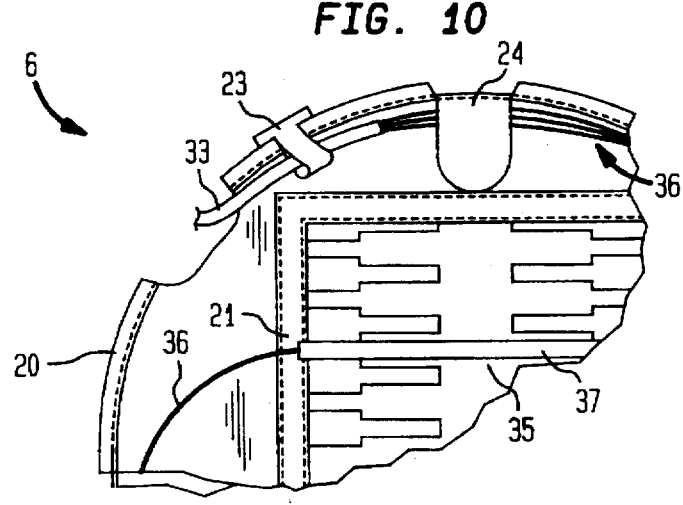

Splice organizing modules are adhered in respective areas of the bottom portion 6 of a splice cassette 5. The ends of two protective tubes 33 are then attached to the bottom portion 6 of the splice cassette 5. This operation can be performed with adhesive or adhesive tape, but preferably is performed using T-shaped engagements 23. The operation for using the T-shaped engagements 23 is indicated in FIGS. 8–10. In FIG. 8, the T-shaped engagement 23 is shown after cutting the side 20 of the bottom portions 6 so that the T-shaped engagement 23 is hingedly connected to the bottom 19. In FIG. 9, the T-shaped engagement 23 is folded at its hinge inwardly of the sides 20 and the end of a protective tube 33 is placed over the T-shaped engagement 23. In FIG. 10, the T-shaped engagement 23 is folded over the protective tube 33 and locked in position by tucking the end portion of the T-shaped engagement 23 under the rim of the side 20. The protective tube 33 is thus held firmly in position so that relatively little stress or strain is imposed upon the optical fibers 36 when moving the splice cassette 5. Another protective tube 33 is then coupled to the other T-shaped engagement 23 and fixed in position in a manner similar to that described immediately above.

The slack of the optical fibers 36 is wound in the bottom portion 16 of the splice cassette 5. The optical fibers 36 are spliced together and the splices are placed in vacant locations in the splice organizing modules 35. In FIG. 9, a particular splice is numbered 37. The service person or a machine controlled by the service person then writes or prints in association with the location of each splice in the splice organizing modules 35, information including, for example, the cable, unit and fiber on each side of the splice. This information can be printed directly on the cover 7 or can be provided on a label 8 adhered to the cover 7. After splicing is completed, the cover 7 is fitted to the bottom portion 6 with the information exposed to view and the tabs 24 are folded into engagement with the cover 7. If desired, the operations described above can be repeated for another splice cassette 5. When all splices have been completed, the splice cassettes 5 are stacked in the splice tray 3 and the strap 27 is wrapped and fastened about the width of the distribution portion 2 and the splice tray 3 to hold the splice cassettes 5 in the splice tray 3 as well as to reinforce the engagement of the splice tray 3 to the distribution portion 2.

Because the splice holder modules 35 each hold six splices and because three splice holder modules 35 are included in the splice tray 3 or each splice cassette 5, the splice holder assembly 1 of this invention can easily hold up to 54 splices, and with care in assembly, can fit another splice cassette 5 for a total of 72 splices. Thus, the splice holder assembly of this invention provides greatly increased splice capacity, and yet does not change the height dimensions of the splice tray 3 relative to the height of the stacked organizing modules of U.S. Pat. No. 5,097,529. Thus, the splice holder assembly 1 will fit inside of the cover disclosed in U.S. Pat. No. 5,097,529. Further, the protective tubes 33, the engagements 28 and respective friction surfaces 29 and the T-shaped engagements 23 prevent the exposure of fragile optical fiber to breakage as would likely occur when moving the splice cassette 5 or the splice tray 3 in the absence of the protective tubes 33, the engagements 28 and friction surfaces 29, and the T-shaped engagements 23. Further, the splice cassettes 5 are vacuum-formed plastic and as such are relatively inexpensive. Still further, visual examination of the color schemes identifying the optical fibers is enhanced against the background provided by using white, opaque plastic to form at least the bottom portion 6 of each splice cassette 5 and/or the bottom 9 of the splice tray 3. In addition, the use of labels 8 adhered to or printed on the card 4 and each splice cassette 5, allows a service person to write splice identification information for later determination of locations of splices and the optical fibers coupled together at each splice. Moreover, the use of splice organizing modules such as those disclosed in U.S. Pat. No. 5,185,845 allow the splice holder assembly of this invention to accommodate several different types of commercially available splices. Yet further, the provision of the retainers 12 with thin portions at which the retainers 12 can be broken off by a service person, together with the apertures 38 and the slots 39, allow the splice tray 3 to be converted to receive organizing modules as disclosed in U.S. Pat. No. 5,097,529.

Although the invention has been described with specific illustrations and embodiments, it will be clear to those of ordinary skill in the art that various modifications may be made therein without departing from the spirit and scope of the invention as outlined in the following claims.

We claim:

1. A splice holder assembly for holding at least one splice coupling optical fibers of a plurality of cables, the splice holder assembly adapted to fit inside of a cover of an optical fiber cable splice closure which receives and holds the plurality of cables, the splice holder assembly comprising:
    a splice tray having a bottom and sides defining an open-topped enclosure, the splice tray having at least one splice organizing module for holding splices coupling respective optical fibers, the splice organizing module mounted in contact with the bottom, and the splice tray having retainers extending from the inner surfaces of the sides of the splice tray at a level above the bottom;
    a card adapted to fit into the splice tray and to be held in position by the retainers, the card enclosing the splice organizing module when the card is inserted into the splice tray; and
    at least one splice cassette adapted to be fitted in the splice tray and supported by the card, the splice cassette including a bottom portion in which is mounted at least one additional splice organizing module for holding splices coupling respective optical fibers, and a cover adapted to fit over the bottom portion to enclose the splice cassette.

2. An assembly as claimed in claim 1, wherein protective tubes housing units of optical fibers are fed from respective cables into the splice tray and the splice cassette, the optical fibers extending from respective protective tubes being spliced together by splices held at locations in the splice organizing modules of the splice tray and the splice cassette.

3. An assembly as claimed in claim 2, wherein the splice cassette includes a bottom portion made of white, opaque material so that color schemes of the optical fibers can be readily viewed.

4. An assembly as claimed in claim 2, wherein a protective tube is held in the splice tray with a foam material attached to the protective tube, the foam material being positioned between an engagement and a friction surface of the splice tray.

5. An assembly as claimed in claim 1, wherein the bottom portion includes at least one engagement to hold the protective tube to the splice cassette.

6. An assembly as claimed in claim 5, wherein the engagement is T-shaped.

7. An assembly as claimed in claim 1, wherein the splice cassette includes a cover and a bottom portion composed of vacuum-formed plastic.

8. An assembly as claimed in claim 1, wherein the splice cassette includes a bottom portion and a cover adapted to fit on the bottom portion, the cover including information to identify the location of a splice in the splice organizing module of the splice cassette and to identify the optical fibers coupled by the splice.

9. An assembly as claimed in claim 8, further comprising:
    a label attached to the cover, the information being printed on the label.

10. An assembly as claimed in claim 9, wherein the information is printed on the cover.

11. An assembly as claimed in claim 1, wherein the card includes information identifying the location of a splice in the splice organizing module and the optical fibers coupled together at the splice.

12. An assembly as claimed in claim 11, further comprising:
    a label attached to the card, the information being printed on the label.

13. An assembly as claimed in claim 11, wherein the information is printed on the card.

14. An assembly as claimed in claim 1, wherein the retainers on one side of the splice tray can be broken off at respective thin portions contacting the sides of the splice tray.

15. A splice cassette for use with a splice tray having a bottom and sides defining an open-topped enclosure, the splice cassette holding splices coupling optical fibers, the splice cassette comprising:
    a bottom portion having a bottom and sides extending from the bottom, the bottom and sides of the bottom portion defining an open-topped enclosure;
    at least one splice organizing module mounted to the bottom of the bottom portion inside of the enclosure of the bottom portion, the splice organizing module holding the splices in respective locations in the splice organizing module; and
    a cover adapted to fit over the bottom portion to enclose the splice organizing module inside of the splice cassette,
    the splice cassette sized to fit inside of the splice tray.

16. A splice cassette as claimed in claim 15, wherein the bottom portion includes tabs extending from the sides of the bottom portion that fold over the cover to hold the cover into engagement with the bottom portion.

17. A splice cassette as claimed in claim 16, wherein the cover defines cutaway portions arranged in correspondence with the tabs, to receive the tabs to hold the cover into engagement with the bottom portion.

18. A splice cassette as claimed in claim 15, wherein the cover defines cutaway portions provided in correspondence to gaps in the bottom portion, the splice cassette receiving at least one protective tube housing a group of optical fibers, through one of the gaps.

19. A splice cassette as claimed in claim 15, wherein the cover has depressed portions disposed along edges of the cover, the depressed portions of the cover engaging with surfaces of the sides inside of the enclosure of the bottom portion, to hold the cover on the bottom portion.

20. A splice cassette as claimed in claim 15, wherein the bottom portion is made of an opaque white material.

21. A splice cassette as claimed in claim 15, wherein at least one of the cover and the bottom portion are composed of vacuum-formed plastic.

22. A splice cassette as claimed in claim 15, wherein the splice cassette receives at least one protective tube housing a group of optical fibers, the bottom portion having at least one engagement to hold the protective tube in the splice cassette.

23. A splice cassette as claimed in claim 22, wherein the engagement is T-shaped.

24. A splice cassette as claimed in claim 15, further comprising:

information provided on the cover, for indicating a location of a splice in the splice organizing module in association with the identities of the optical fibers coupled by the splice.

25. A splice cassette as claimed in claim 24, wherein the information is printed on a label adhered to the cover.

26. A splice cassette as claimed in claim 24, wherein the information is printed on the cover.

27. An assembly for holding splices coupling optical fibers, the assembly comprising:

a splice tray for holding a first group of splices and slack of the optical fibers spliced by the first group of splices; and at least one splice cassette fitting in the splice tray, for holding a second group of splices different from the splices of the first group, and the slack of optical fibers spliced by the second group of splices.

28. An apparatus receiving an elongated member, the apparatus comprising:

a container having a side with a rim, a portion of the side defining a T-shaped engagement, the T-shaped engagement being folded away from the side, the elongated member being overlain on the T-shaped engagement and the T-shaped engagement being folded over the elongated member, an end of the T-shaped engagement being tucked under the rim to hold the elongated member between the side and the T-shaped engagement.

29. An apparatus as claimed in claim 28, wherein the container is a splice cassette.

30. An apparatus as claimed in claim 28, wherein the elongated member is a protective tube housing optical fibers.

* * * * *